United States Patent Office 2,882,720
Patented Apr. 21, 1959

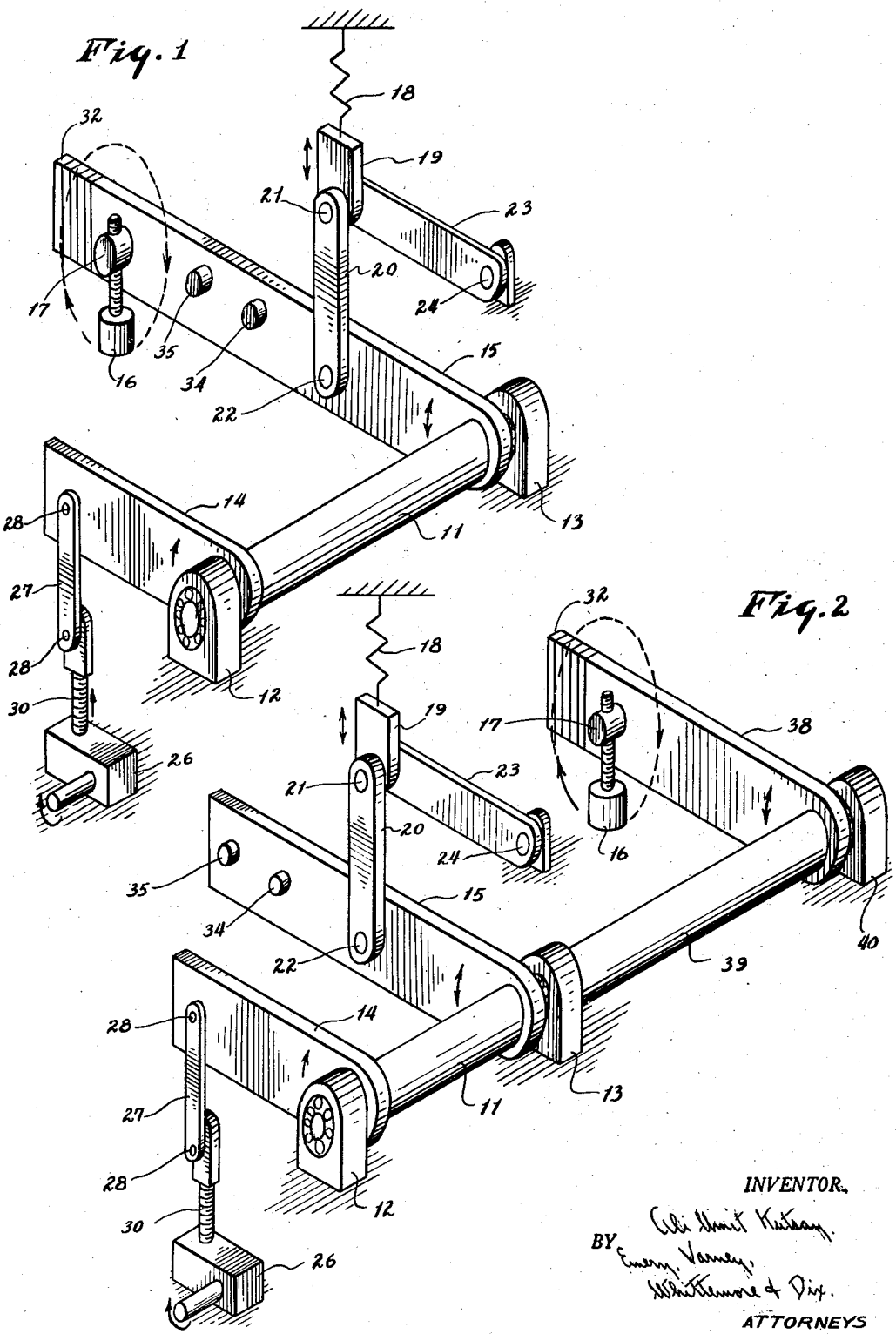

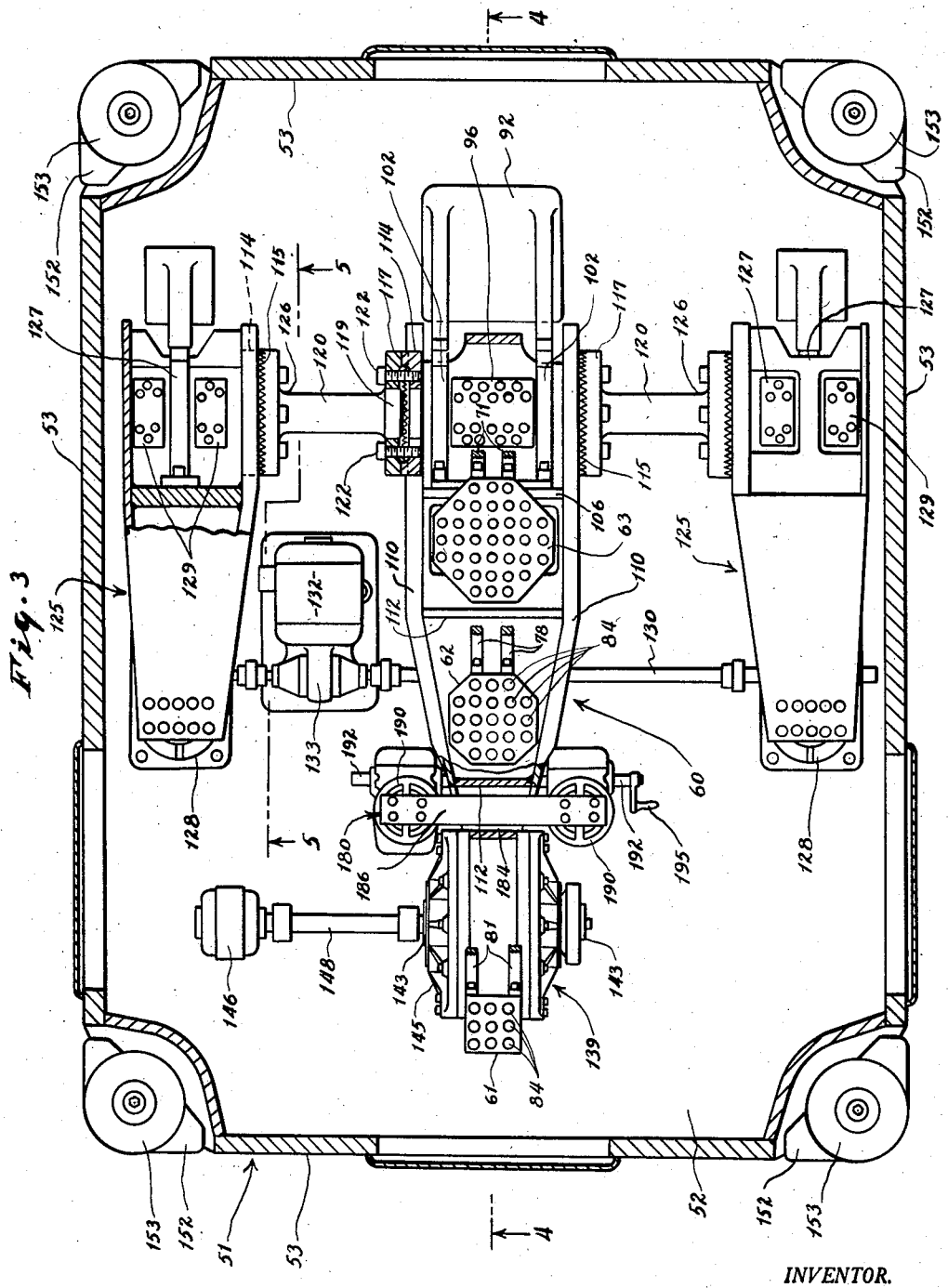

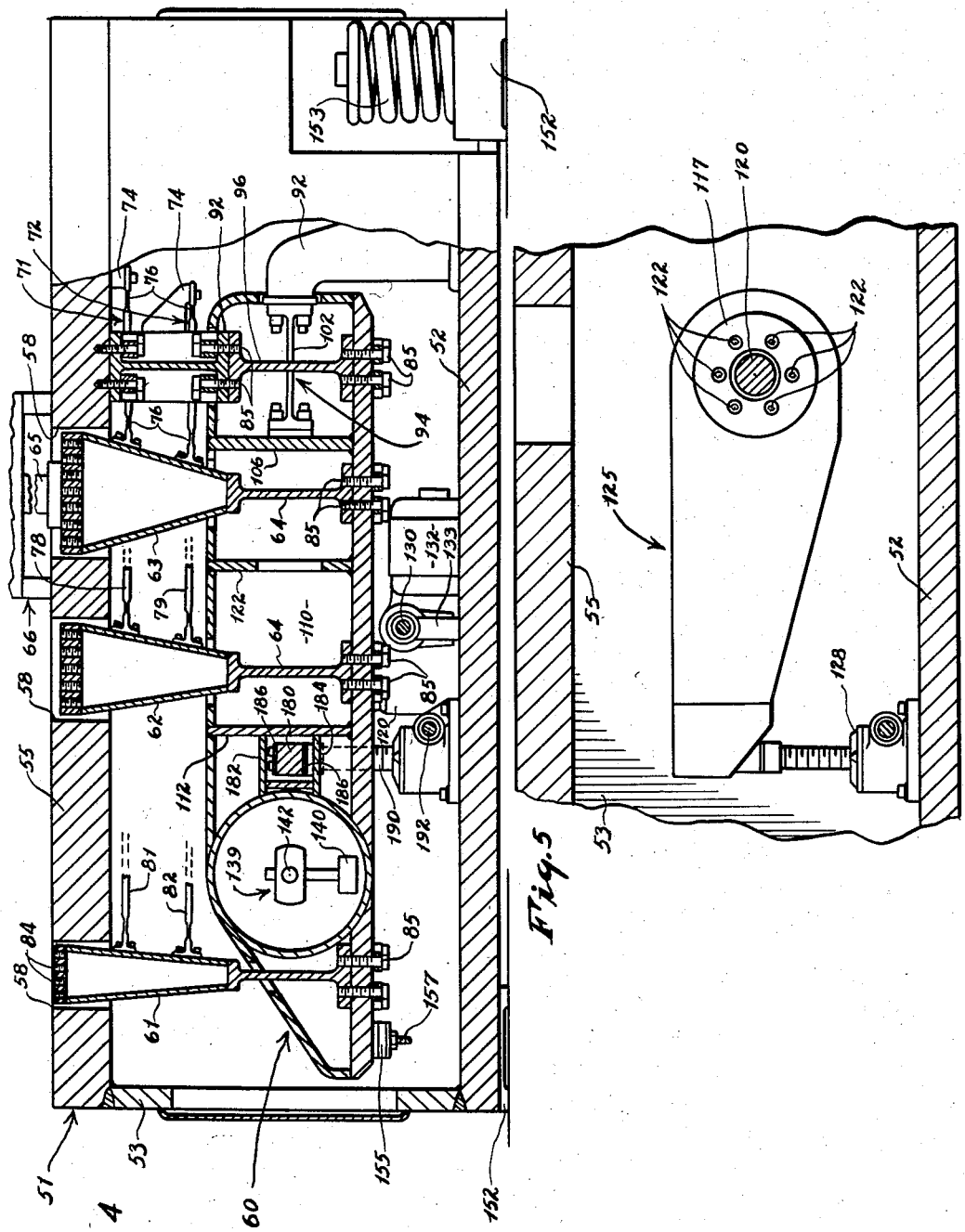

2,882,720

UNIVERSAL FATIGUE MACHINE WITH TORSIONAL ELASTIC LOADING SPRINGS

Ali Umit Kutsay, Ridgefield, Conn., assignor, by mesne assignments, to Baldwin-Lima-Hamilton Corporation, Philadelphia, Pa.

Application April 15, 1955, Serial No. 501,469

12 Claims. (Cl. 73—91)

This invention relates to an improved apparatus or machine for performing fatigue tests on all kinds of metal and non-metal material specimens, as well as on structures, assemblies, and manufactured parts.

A fatigue test is one in which the part to be tested is subjected to a large number of repeated stress cycles until failure occurs. The stresses applied by the fatigue machine are made up of two components, namely, the static or mean stress, on which is superimposed the fluctauting or alternating stress. The maximum resulting stress is the sum of the static and alternating stresses, and the minimum stress is their difference. In order to function properly, a fatigue machine must accurately maintain the magnitude of the static and alternating stresses in the specimen undergoing test, until the specimen fails or until the test is stopped. Machines which satisfy this requirement are known as constant-alternating-force type of fatigue machines.

In fatigue tests on materials or structures that have perfectly stable mechanical properties, the deflection of the specimen remains the same during a constant-alternating-force fatigue test. For such materials, a simple crank mechanism, producing repeated deflections at the loading point of the specimen, also produces constant-alternating forces. Actual materials and structures subjected to high repeated stresses that can produce fatigue failures, do not follow such ideal behavior. The elastic constants of the great majority of specimens and structures change continuously during a fatigue test, which means that the deflection corresponding to a constant-alternating force, will change continuously during the fatigue test. A constant-alternating-force type of fatigue machine is therefore one in which the amplitude of vibrations of the loading anvil, changes continuously so as to maintain the required constant-alternating-force in the specimen of variable stiffness or elastic modulus.

There are several methods of obtaining constant-alternating-force operation in mechanical types of fatigue machines. Two important such methods are the following:

(i) Use a principle of operation which inherently produces constant-alternating-force. One such common principle is that known as inertia-force-compensation. In this, a mechanical oscillator produces an accurately known alternating force which is transmitted to the test object. All other vibratory forces produced by the inertia of the moving members are compensated by elastic springs which restrict the motion of these members.

(ii) Use any method to develop alternating forces in the machine, but transmit the force to the specimen through a force-sensitive member which produces an electrical voltage proportional to the alternating force it transmits. As soon as the force in the specimen begins to change, suitable controls operated by the change of voltage output from the sensitive member, restore the alternating force to its desired value. A system using mechanical resonance vibrations is very advantageous since large specimen forces can be produced with relatively small oscillator mechanisms due to the large resonance amplifications possible with most materials.

It is an object of this invention to apply the two above well-known principles, together with the following two basic inventive features, to obtain improved fatigue testing machines:

(a) Fatigue machines based on principles (i) and (ii) described above, have utilized beam springs or helical springs as their elastic members. The machines of this invention utilize torsion bars, of any cross-section, but perferably of solid round section or tubular section.

(b) Existing fatigue machines based on principles (i) and (ii) described above, have had only one force capacity, one deflection capacity and one specimen loading anvil. The machines of this invention have several loading anvils, several force capacities and several deflection capacities, one for each loading anvil.

The two basic improvements (a) and (b) described above, enable great advances in the field for fatigue testing, as explained below.

Existing constant-alternating-force type mechanical fatigue machines are restricted in capacity, and high in cost, because it is extremely difficult to design and manufacture high capacity linear elastic springs which will withstand and transmit the necessary alternating forces with substantial deflections. The springs used are either conventional helical springs of round or rectangular wire or they are beam springs of variable section to distribute the stress. Not only is their cost extremely high for large testing machines, but their weight is excessive and this reduces the performance of the machine, because performance is best when the effective vibrating weight of the spring is a minimum.

Torsion bars, used as springs, can very easily be bulit to provide dynamic capacities many times larger than those of beam springs or helical springs, and at considerably less cost per unit of capacity. By providing generous fillets and by making large diameter clamping flanges, the stress-concentration in the torque element can be kept very low thus minimizing the danger of fatigue failures in the machine.

Present day helical spring winding techniques are limited to wire sizes up to approximately three inches in diameter. Individual helical springs made of better spring materials (and with as small spring index as possible to increase capacity) cannot be built to exceed about 20,000 pounds force capacity at high frequencies of alternating force and with high deflections. Torque bars with as large diameter as necessary can be designed and built, and for example, a 20 inch diameter torque bar, with a torque arm of 40 inches has an alternating force capacity of approximately 1,000,000 pounds. Any deflection can be provided by selecting the proper length of torque bar. Surges or other irregularities would present considerably less of a problem, since unlike the helical or beam springs, the mass of the torque bar is subjected to negligible vibratory motions.

The forces produced in the machines of this invention are transmitted by means of two or more rigid torque arms or rigid beams which are supported on fixed pivots. The axis of these pivots coincides with the axis of the torque bar or bars. The force applied to the specimen is transmitted through the loading beam. The leverage, or distance between the fixed pivot and the line of action of the specimen force, determines the force capacity and deflection capacity available at the particular location of the beam.

The force is applied to the specimen by means of a loading anvil which is actuated from the loading beam by suitable pivots and linkages. Instead of just one loading anvil, as is common with existing fatigue machines, the machines of this invention have several loading anvils, connected to the loading beam at different locations along its length. Each loading anvil, therefore, has a different force capacity and different deflection capacity. The anvil nearest the fixed pivot has the greatest force capacity and the smallest deflection capacity of the group, while the anvil furthest away from the fixed pivot has the largest deflection capacity and the smallest force capacity. The anvil nearest the fixed pivot would be most suitable for rigid, strong specimens such as tension-compression members, while the anvil furthest from the fixed pivot is most suitable for resilient specimens, such as bending or torsion members, tested on suitable fixtures on top of the machine.

Existing machines do not permit such flexibility of testing. It was often necessary to equip a given machine with several costly, complicated "lever" type fixtures and attachments, which were cumbersome, and which occupied most of the space available for the test specimen or structure. This, oftentimes, restricted the size and shape of structure that could be tested on a relatively large machine, and complicated the problem of mounting the test structure. The question of storage of these various fixtures when not in use, was also an inconvenience.

In the machine of this invention, the various leverages are "built-in" and contained within the machine, leaving a clear, unrestricted top platform for the particular test structure. The advantages resulting from this feature are considerable, since it is usually impossible to predict in advance all the types and sizes of structures that a particular laboratory will have to test for the entire life of the machine.

A further advantage of this feature is that one machine of this invention can replace several existing machines of conventional single capacity. In order to maintain adequate accuracy in the tests, it is considered good practice to operate a fatigue machine at no less than 20 percent of its force capacity, and certainly no less than 10 percent of its capacity. There are certain fixed errors in the machines which are independent of the test force, so that their presence makes for low accuracy at the small test forces. For example, a fatigue machine of 100,000 pound force capacity may have a fixed error of 400 pounds, irrespective of the test force required for any given specimen. At 20 percent of its capacity, namely, at 20,000 pounds test force, this error would still permit 2 percent force accuracy, which is usually adequate and acceptable in a fatigue test. At 10 percent of capacity, this 400 pound error produces a 4 percent force error in the specimen, and at still smaller specimen forces, this percentage error becomes still greater.

This means that a large machine cannot be used to perform tests on small specimens requiring less than 10 percent of its force capacity. As a result, fatigue testing laboratories have to be equipped with batteries of machines, of various force capacities, in order to cover the entire range of test loads they may encounter. The feature of the machine of this invention which enables several force capacities, means that one of these machines may replace two or more of the existing single-capacity machines. This may produce great savings in initial cost of equipment, as well as in laboratory space.

Other objects, features and advantages of the invention will appear or be pointed out as the description proceeds.

In the drawing, forming a part hereof, in which like reference characters indicate corresponding parts in all the views;

Figure 1 is a schematic perspective view of a simplified fatigue testing machine and illustrating the principle of operation of the below-resonance embodiment of this invention;

Figure 2 is a view similar to Figure 1, but illustrating a near-resonance version of this invention;

Figure 3 is a top view of a fatigue machine embodying this invention, the housing of the machine being shown in section, and parts of the beams broken away and in section to illustrate the construction;

Figure 4 is a side view, mostly in section along the line 4—4 of Figure 3; and

Figure 5 is a fragmentary sectional view taken on the line 5—5 of Figure 3.

In the machine shown in Figure 1, a torsion or torque bar 11 is supported on fixed pivots 12 and 13 at its two ends. These pivots can be of the ball-bearing type, plain sleeve bearing, or cross-flexure type. The cross-flexure type of pivots are most suitable for large capacity machines, and are described extensively later.

Loading beam 15 is rigidly fastened to one end of the bar 11 and carries an unbalanced mass 16 rotating on a shaft 17, driven at constant frequency by a synchronous motor not shown. Test specimen 18, fixed to the base of the machine at its upper end, is stressed in tension-compression by an anvil 19 actuated by a link 20 between pivots 21 and 22. A lateral guide 23 having a fixed pivot 24 keeps the anvil 19 vibrating in a near-vertical path.

The static force is applied by means of the beam 14 which is rigidly fastened to the other end of the torque bar 11. The free end of the beam 14 is actuated by screw jack 26 and link 27 pivoted at two places 28. Rotation of an input shaft of the jack 26 raises or lowers a screw 30 which twists the torque bar 11 which in turn applies static compression or static tension to the specimen 18. The static force in the specimen is measured by the static torsional deflection of the bar 11.

The alternating force is produced by means of the oscillator 16, which can be adjusted by means of the screw mechanism so as to obtain the necessary unbalance distance of mass 16 from the center of rotation of the oscillator. Since this mass rotates at constant frequency at all times, the unbalance distance of the mass 16 is proportional to the centrifugal force it produces. The horizontal component of this centrifugal force is transmitted as an axial force along the beam 15 and is absorbed by the fixed pivot 13. The vertical component of the centrifugal force is transmitted to the specimen 18, making allowance for the leverage ratio involved.

Constant-alternating-force is maintained in the test specimen by means of inertia-force-compensation which functions as follows: The inertia forces of the vibrating parts of the machine tend to increase the alternating force in the specimen. These vibrating parts are the beam 15, anvil 19, guide 23, link 20, etc. The torque bar 11, which twists elastically as the beam 15 vibrates, produces restraining effects, which counterbalance the inertia effects of the vibrating parts. By properly designing the torque bar 11 it is possible to produce accurate inertia force compensation, so that irrespective of the changing amplitude of vibrations caused by the changing properties of the specimen 18, the alternating force in the specimen 18 will remain constant, as determined by the original setting of oscillator force produced by the oscillator 16.

Inertia-force-compensation is obtained by the following experimental adjustment. The test specimen 18 is removed from the machine and the oscillator 16 is adjusted very near zero force setting. The machine is operated very briefly and different numbers of weights 32 are placed on the beam 15. Gradually adding weights 32 will first increase the amplitude of vibrations of the beam 15 and then decrease the amplitude of vibration of this beam. The mass of weights 32 which produce the maximum amplitude of vibrations represent the proper setting for inertia-force-compensation. The test specimen 18 is then placed in the machine and tested.

The test specimen 18 is loaded through the pivot 22 in the beam 15. Additional pivots 34 and 35, can be connected to additional anvils (not shown) to obtain several force capacities and several deflection capacities for the testing machine.

The principle of operation and the mechanism of the near-resonance version of this invention, is shown schematically in Figure 2.

The static force mechanism is the same as in the case of Figure 1 and corresponding parts are indicated by the same reference characters.

The mechanical oscillator 16 is mounted on a third beam 38 known as the "resonance beam." The loading beam 15 and the resonance beam 38 are connected by a "resonance torque bar 39." Fixed pivot 40 supports one end of the torque bar 39, while the other end is supported by fixed pivot 13. Torque bars 11 and 39, as well as pivots 12, 13 and 40 have a common axis. The unbalanced mass 16 rotates on a shaft 17 at a frequency which very nearly coincides with the resonant frequency of vibration of the overall mechanical system consisting of beams 38 and 15, and torque bars 39, 11, as well as the specimen 18.

This principle of operation has the great advantage of enabling large amplification of the oscillator force to produce high loads in the specimen, with relatively a small capacity oscillator. The alternating force in the specimen is adjusted either by the setting of the oscillator mass 16, or by adjusting the speed of rotation of the mass 16, to produce the necessary resonance amplification. An alternate way is to adjust the effective weight of the beam 38 by adding or removing weights 32. In the one case, it is the operating frequency that is adjusted, while in the second case it is the natural frequency which is adjusted, but the end result is the same in that these two frequencies are made to coincide so as to produce resonance.

One drawback of resonance machines is the requirement of continuous manual adjustment or automatic adjustment of the alternating force in the specimen which would otherwise change as the specimen undergoes changes during the test. It is therefore necessary to incorporate force-sensing elements either in the anvil 19 or at the fixed support of specimen 18. The output from force-sensing transducers can then be used to control the force to the desired value.

Once again, the test specimen 18 is loaded through one of the three pivots. Additional anvils can be connected to the other pivots 34 and 35 on the beam 15 to obtain several force capacities and deflection capacities from the same machine.

In both types of machines, resonance and below resonance, the machines of this invention are simpler, less expensive, and permit greater specimen deflections than in existing machines.

Figures 3 to 5 show a machine having a box frame 51 with a bottom 52, side walls 53 and a top 55. The frame 51 can be a heavy weldment, a heavy casting, or a bolted assembly of heavy plates and structural members. There are openings 58 through the top plate 55 at regions located above a main loading beam 60 of the testing machine.

There are anvils 61, 62 and 63, supported from the main beam 60 by I-beam sections 64 which extend upwardly from the bottom of the beam 60. These anvils 61, 62 and 63 extend through the openings 58 in the top plate 55. A test specimen 65 is shown on the anvil 63 in position to be tested, the upper end of the test specimen being held by a specimen holder assembly 66 connected to the top plate 55.

It is desirable to maintain the forces against the specimen 65 in a straight line. In order to obtain this result, the anvil 63 is connected to bars 71 and 72, and the other ends of these bars 71 and 72 are secured to lugs 74 which extend from fixed parts of the housing or frame of the machine. These bars 71 and 72 have section 76, of reduced cross section, and the bars 71 and 72 bend at these sections of reduced thickness to provide a link motion. The sections 76 are, in effect, pivots for the bars 71 and 72.

The length of the bar 71, between its pivot sections 76, is equal to the corresponding length of the bar 72 so that these bars 71 and 72 form, with the anvil 63, a folding parallelogram linkage with its fixed pivots the sections 76 adjacent to the lugs 74. By having the lengths of the bars 71 and 72, between the center points of their pivot sections 76, equal to the distance of the vertical center line of the anvil 63 from the pivot axis of the main beam 60, the force exerted by the anvil 63 can be maintained vertical at all times.

The anvil 62 is connected to the left hand ends of bars 78 and 79 which correspond to the bars 71 and 72 of the anvil 63. The effective length of the bars 78 and 79, that is, the distance between their reduced sections which provide the pivot action of these bars 78 and 79, is equal to the distance of the vertical center line of the anvil 62 from the pivot axis of the loading beam 60. The drawing does not show the right hand ends of the bars 78 and 79, but it will be understood that they are connected to fixed lugs on the main frame of the machine, corresponding to the fixed lugs 74.

There may be two pairs of bars 78 and 79 with one pair extending on each side of the anvil 63 so as to reach beyond the anvil 63 to the fixed connecting lugs which are in the same region as the lugs 74 lengthwise of the machine.

The anvil 61 is connected with bars 81 and 82, corresponding to the bars 71 and 72, and which are connected with fixed lugs on the main frame of the machine in the region of the lugs 74 so that the effective length of the bars 81 and 82 is equal to the distance of the vertical center line of the anvil 61 from the pivot axis of the beam 60. There may be two pairs of bars 81 and 82, with one pair on one side and the other pair on the other side of the anvils 62 and 63. It will be further understood that the bars 78 and 79, and also the bars 81 and 82, can be made with any necessary offsets for passing around obstructions in order to reach their connections to the main frame of the machine.

The anvil 61 is smaller than the anvil 62 since the anvil 61 transmits less load, it being located further from the axis of oscillation of the loading beam 60. Likewise, the anvil 62 is smaller than the anvil 63 because it transmits less load than the anvil 63. All of the anvils 61, 62 and 63 have a number of threaded openings 84 in their top faces for connecting the anvils with different types of specimen holders. The type of holder used depends upon the size of the test specimen and upon whether the fatigue test is to be one in compression, tension, bending, torsion, or any combination of these stresses.

The I-beam sections 64, which support the anvils 61, 62 and 63 from the loading beam 60 have their bottom flanges connected to the beam 60 by screws 85. The webs of these I-beam sections 64 flex to provide the necessary pivotal action for maintaining the anvils 61, 62 and 63 in vertically extending positions regardless of the angular movement of the main loading beam 60.

The pivots of this machine, provided by the bending of metal sections, are a desirable and economical construction where the load to be transmitted is relatively high. In some cases ball or roller bearings can be used but it is an important consideration that the pivots must withstand for a long time the severe static and alternating loads and stresses, as well as the angular oscillations of the machine, without damage, wear or failure. Furthermore, the elastic or frictional moments necessary to cause movement of the pivots, must not exceed a fraction of one percent of the torsional moments transmitted at the pivot points by the torsion springs. These pivots, irrespective of their designs, act as free pivots and their angular deflection does not, measurably cause stresses in the tested specimens.

Specimen 65 can be subjected to any combination of static and alternating tension-compression stress. For example, assuming the capacity of the machine at this particular station on loading beam 60, is 60,000 pounds of static load, and 60,000 pounds of alternating load, this specimen can be tested under tension-fatigue cycles ranging from zero to 120,000 pounds, or under compression-fatigue cycles ranging from zero to 120,000 pounds, by using the extreme values of tension or compression preload together with the maximum alternating load. Or, the preload can be set at zero, and the specimen tested under reversed loads varying from 60,000 pounds tension to 60,000 pounds compression. Any combination of static and alternating loads can be applied.

The main loading beam 60 is supported from the box frame 51 by brackets 92 and a pivot 94. Once again, this pivot must be made of components most suitable for the particular load and motion. Figure 4 shows the pivot 94 made of cross-flexures of I-beam section, which will be called "X-plates." These X-plates consist of several short I-beam sections including a center I-beam 96 which has its lower flange secured to the main loading beam 60 by screws 85. The upper flange of the I-beam 96 is secured to a horizontally extending face of the upper bracket 92 by screws 85.

Just beyond the opposite ends of the I-beam 96, there are two other I-beams 102 which are preferably of the same cross section as the I-beam 96. Each of these I-beams 102 has a flange at one end connected to a vertically extending face of the lower bracket 92 by screws and has a flange at its other end connected to a vertically extending partition plate 106 of the main loading beam 60. The connection between the flange of the I-beams 102 and the face of the partition plate 106 may be made by screws or any fastening means, as in the case of the connections of the other flanges of the I-beams 96 and 102.

The I-beam 96 prevents vertical movement of the main loading beam 60, and the other I-beams 102 prevent horizontal movement of the main loading beam 60 with respect to the frame 51. These connections of the main loading beam 60 to the fixed frame 51 leaves the main loading beam 60 free to oscillate about an axis extending through the point at which the webs of the I-beams 96 and 102 cross one another. When such movement takes place, there is a slight bending of the webs of the I-beams 96 and 102.

The main loading beam 60 is a box beam having side walls 110 braced by transversely extending webs 106 and 112. There are openings in the opposite side walls 110 into which rings 114 fit. The rings 114 are an integral part of the beam 60 and they are preferably shrink fits in the openings in the side walls of the beam.

Each of the rings 114 has a circle of jaws 115 extending from its outer face. These jaws are similar to the gear teeth on a crown gear, but without the curved faces of the gear teeth. The jaws 115 on the rings 114 engage complementary jaws on other rings 117 which are shrunk over flanges 119 at the ends of torsion bars 120 which serve as the springs of the testing machine of this invention. The rings 117 are connected to the rings 114 by screws 122. The rings 114 and 117 with their engaging jaws, and with the screws 122 for holding the jaws in engagement with one another are representative of detachable fastening means between the torsion bars 120 and the main loading beam 60 of the fatigue machine.

The torsion bars 120 have similar flange and ring connections at their outer ends to static loading beams 125. There are fillets 126 connecting the torsion bars with their flanges for preventing concentration of forces at the junctures of the torsion bars 120 with their flanges 119.

It will be understood that the torsion bars 120, which serve as the springs of the fatigue machine of this invention, for transmitting the load from the static loading beams 125 to the main loading beam 60, may be of solid metal throughout their entire cross-section, or they may be hollow. Whether these torsion bars 120 are made solid or tubular depends upon the amount of deflection desired and the amount of static load which is to be placed on the test specimen for use with loads of a predetermined amplitude of vibration. It also depends upon the size of the machine and the diameter of the torsion bars 120.

The static loading beams 125 are supported from the box frame 51 by the same kinds of brackets and X-plates made from I-beam sections, as in the construction already described for the main loading beam 60; but these beams 125 each have a middle I-beam section support 127 with its web substantially horizontal, and side I-beam section supports 129 with their webs substantially vertical. This is a reversal from the relation of the I-beam sections 96 and 102 which support the main loading beam 60, but the operation is the same and either construction is optional.

The construction in Figure 3 shows two static beams 125 and two torsion bars 120, which makes a symmetrical design. However, a machine can also operate satisfactorily with one torsion bar 120 and one static loading beam 125, the latter arrangement having advantages in case of low capacity machines. In order to apply a static compressive load to the test specimen 65, the torsion bars 120 are urged clockwise about their axes to turn the main loading beam 60 in a clockwise direction about its supporting pivot 94, but the test specimen 65 prevents such clockwise movement of the main loading beam.

Similarly, in order to apply a static tensile load, torsion bars 120 are twisted counterclockwise. The static load is measured in both cases by the angular twist of torsion bars 120. Any suitable displacement measuring device can be used for this, such as a dial indicator, a micrometer microscope, a linear differential transformer, etc.

The static load is transmitted to the torsion bars 120 from static loading jacks 128 located under the ends of the beams 125. In the construction illustrated, the jacks 128 are shown as conventional screw jacks, but they are operated in unison by a connecting shaft 130 which insures equal movement of both of the jacks 128 for maintaining the same displacement and load for both beams 125 at all times. The shaft 130 is driven by an electric motor 132 through reduction gearing 133.

The beam 60 is vibrated by an oscillator 139 comprising an eccentric weight 140 on a shaft 142 which turns in bearings 143 of a housing 145 secured to the main loading beam 60 near the free end of this beam. The shaft 142 is rotated by an electric motor 146 through a driving connection 148 which has flexible couplings at its ends, to make it possible for the motor 146 with a stationary frame to rotate shaft 142 of the mechanical oscillator while the latter vibrates transversely.

The drawing is largely diagrammatic in order to show the invention in a more simple and understandable illustration. The box-like heavy frame 51 is shown with supports 152. These supports are connected by spring mountings 153 to the frame of the machine. These supports provide seismic or resilient mounts that deflect appreciably thus providing efficient vibration isolation of frame 51. No vibration is transmitted from the machine to the floor, and no shocks or vibrations produced by surrounding machines can affect the machine. A preload sensing device can be used in conjunction with the preload motor 132 to automatically adjust the preload for a test. The illustration of such operating means is not necessary, however, for a complete understanding of this invention.

When the machine is to be operated as a resonance machine, it is necessary to balance the mass and effective moments with the natural frequency of the torsion bars 120 which serve as the springs of the machine. In order to thus tune the machine, weights 155 are connected to the main loading beam 60 at a substantial distance from the axis of oscillation of the beam 60. These weights 155 are connected to the beam 60 by a bolt 157 which is representative of detachable fastening means by which more or fewer weights, and weights of various sizes, can be attached to the beam 60 for the purpose of making the oscillating mass have the value necessary for resonance at the speed at which the oscillator 139 is turning.

It is desirable to have a bumper which limits the maximum movement of the main loading beam 60. This bumper prevents sudden and excessive movements of the machine when a specimen fails.

A bumper bar 180 extends through the beam 60, there being a boxed in passage through the beam for the bumper bar 180. At the top of this passage there is a wall abutment 182, and there is a lower wall abutment 184 underneath the bumper bar 180. These walls 182 and 184 are integral parts of the loading beam 60. Soft facing material such as rubber 186 is provided on the top and bottom surfaces of the bumper bar 180.

At its opposite ends, the bumper bar 180 is connected to the upper ends of screw jacks 190 and these screw jacks are operated in unison by a common operating shaft 192. This shaft 192 is adjusted, to properly locate the bumper bar 180, by means of a hand crank 195 connected to one end of the shaft 192.

The proper level of location of the bumper bar 180 depends upon the loading of the machine. In practice, the bumper bar 180 is located so that it is close to the wall 182 or 184 when the wall is at its limit of oscillation which most closely approaches the bumper bar 180. In choosing whether to locate the bumper bar close to the wall 182 or the wall 184, the determination is made by the particular test which the machine is being used for. That is, whether the test is a compression or a tension test or whether it is a bending test, and if bending, in which direction the bending load is imposed. The object in adjusting the bumper bar 180 is to locate it close to whichever wall 182 or 184 will move toward the bumper bar when the test specimen fails. Allowance must be made for deforming of the test specimen before it breaks.

The preferred embodiments of the invention have been illustrated and described, but changes and modifications can be made, and some features can be used in different combinations without departing from the invention as defined in the claims.

What is claimed is:

1. A fatigue testing machine having inertia force compensation and comprising a main loading beam pivotally supported from one end for oscillating angular movement about its pivotal axis, an oscillator connected with the main loading beam for imparting high frequency oscillation to the beam about said axis, an oscillating specimen platform, means for linearly guiding the platform during its oscillatory movement, means for pivotally connecting the platform to one point of the main loading beam so that at all times the linear motion of the specimen platform is identical to, and in synchronism with, the linear component of motion of the point of connection on the beam, a torsion bar rigidly connected at one end to said loading beam, the axis of the bar being co-axial with the pivotal axis of the beam, and means rigidly connected with the other end of the torsion bar for imparting a static load on the test specimen superimposed on the oscillating fatigue load, and the masses of the motion-transmitting connections being correlated with the elasticity of the torsion bar so that substantially all vibratory forces resulting from the inertia of all moving parts are compensated by the elasticity of the torsion bar when the oscillator is operated at its intended frequency.

2. The fatigue testing machine described in claim 1 and in which the machine includes means spaced along the lengthwise axis of the loading beam for selectively testing specimens within different ranges of force and amplitude of vibration.

3. A fatigue testing machine for applying alternating forces to a specimen, said machine including means for loading a test specimen, a mechanical oscillator for producing alternating loading force, a system of force-transmitting connections between the oscillator and the specimen loading means including a torsion bar that twists within its elastic limit to provide a resilience in said motion transmitting connections, means for operating the oscillator at substantially the resonance frequency of the system, the force-transmitting means including a beam that oscillates about the axis of the torsion bar secured to the beam and with its neutral axis in alignment with the axis of oscillation of the beam, the torsion bar being located between the mechanical oscillator and the beam so that forces from the mechanical oscillator are transmitted to the beam through torsion forces in the torsion bar, and another torsion bar connected with the beam and located between the beam and a static loading device, and means for moving the static loading device to impart predetermined degrees of twist to the second torsion bar to apply force to the beam and load the specimen with force which is superimposed on the alternating forces from the mechanical oscillator.

4. The combination set forth in claim 1 further characterized by the provision of a second torsion bar, extending from and rigidly secured to the static loading beam on the opposite side thereof from the first torsional bar and co-axial therewith, a second static loading beam rigidly connected to the other end of the second torsion bar, the torsion bars connecting the static loading beams and the main loading beam into a unitary assembly which is rigid but for the torsional twist resilience of the torsion bars, and means for preventing displacement of this assembly with respect to the main frame of the testing machine.

5. A fatigue testing machine comprising a box frame having top, bottom, side and end walls, a main loading beam located within the frame and having X-plate supports by which one end of the main loading beam is connected with the box frame for oscillation about an axis, static loading beams located on opposite sides of the main loading beam and having X-plate supports connecting them with the frame for oscillation about axes that are in alignment with the axis of oscillation of the main loading means, a torsion bar connected to the main loading beam and extending from the main loading beam to one of the static loading beams to which the torsion bar is rigidly connected, another torsion bar extending from the other side of the main loading beam to the other static loading beam, the torsion bars being in alignment with one another and the beams being spaced from one another by substantial distances, a jack under each of the static loading beams at the end of each beam which is remote from the torsion bar connected to that beam.

6. A fatigue testing machine comprising a main loading beam pivotally supported from one end for oscillating angular movement about its pivotal axis, an oscillator connected with the main loading beam for imparting high frequency oscillation to the beam about said axis, a specimen platform means for linearly guiding the platform during its oscillating movement, means for pivotally connecting the platform to one point of the main loading beam so that at all times the linear motion of the specimen platform is identical to and in synchronism with the linear component of motion of the point of connection on the beam, a torsion bar rigidly connected at one of its ends to said loading beam, the axis of the bar being coaxial with the pivotal axis of the beam, and means rigidly connected with the other end of the torsion bar for imparting a static load on the specimen, the static load being superimposed upon the oscillating test load.

7. The combination set forth in claim 6 further characterized in that another specimen platform is connected to the main loading beam at a greater distance from the pivotal axis of the beam than is the position of the first specimen platform, whereby the second specimen platform has an amplitude of movement different from that of the first specimen platform.

8. A fatigue testing machine comprising a frame, a main loading beam supported by the frame, an oscillator connected to the main loading beam, supports for the main loading beam including supporting means extending between the main loading beam and the frame, which supporting means are rigid in a vertical direction but resilient to forces applied in a horizontal direction, other supporting means extending between the main loading beam and the frame, said other supporting means being rigid in a horizontal direction but resilient to force applied with a vertical component, the supporting means extending across one another at an axis about which the beam oscillates in response to combinations of vertical and horizontal force, a static loading beam in the main frame and spaced from the main loading beam in the direction of the extent of said axis, supporting means for the static loading beam similar to those of the main loading beam and with an axis of angular movement in alignment with the axis of oscillation of the main loading beam, and motion transmitting connections between the static loading beam and the main loading beam including a torsion bar connected at its opposite ends with both of said beams and having a neutral axis in line with the axes of angular movement and oscillation of the static loading and main loading beams, respectively.

9. A fatigue testing machine comprising a main frame, a pivotal main loading beam supported from the main frame, a mechanically actuated oscillator carried by the main loading beam near the free end of the beam, a supporting platform on the main loading beam beyond the oscillator for supporting a test specimen which is to be subject to stress of substantial amplitude, other specimen supporting platforms carried by the main loading beam at spaced locations which are progressively nearer to an axis of oscillation of the main loading beam, a static loading beam, and a torsion bar rigidly connected to the static loading beam and to the main loading beam with the axis of the torsion bar in line with the axis of oscillation of the main loading beam.

10. The combination set forth in claim 6 further characterized by the provision of a weight holder on the main loading beam for holding selected weights or combinations of weights for tuning the machine for resonance operation.

11. A fatigue testing machine comprising a main loading beam supported for oscillation about an axis, two other beams, one on each side of the main loading beam, supported for oscillation about a common axis with the main loading beam, a vibrator carried by one of said other beams, a resonance spring connecting the beam having the vibrator and the main loading beam, said resonance spring comprising a torsion bar rigidly connected at its opposite ends to the main loading beam and to the beam having the vibrator, the torsion bar extending in the direction of the axis of oscillation of the beams, and adjustable means for exerting a predetermined load force against the second of said other beams, and a static load spring connecting the main loading beam with the other beam having the static load, said static load spring comprising a torsion bar connected at its opposite ends to the main loading beam and the beam having the static load, said static load spring extending in the direction of the common axis of oscillation of the beams.

12. The fatigue testing machine described in claim 11 and in which the main loading beam has supports at different distances from its axis of oscillation for exerting different forces and different amplitudes against a specimen to be tested.

References Cited in the file of this patent

UNITED STATES PATENTS

| 1,827,560 | Binckley | Oct. 13, 1931 |
| 2,591,444 | Lazan | Apr. 1, 1952 |
| 2,693,699 | Federn | Nov. 9, 1954 |

FOREIGN PATENTS

| 675,755 | Germany | May 16, 1939 |
| 731,259 | Germany | Feb. 4, 1943 |